(12) United States Patent
    Mansfield

(10) Patent No.: US 11,193,548 B2
(45) Date of Patent: Dec. 7, 2021

(54) BRAKE ASSEMBLY SHIELD AND SCRAPER

(71) Applicant: Polaris Industries Inc., Medina, MN (US)

(72) Inventor: R. Marcus Mansfield, North Branch, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 16/816,582

(22) Filed: Mar. 12, 2020

(65) Prior Publication Data

US 2020/0208693 A1    Jul. 2, 2020

Related U.S. Application Data

(63) Continuation of application No. 15/625,023, filed on Jun. 16, 2017, now Pat. No. 10,591,003.

(51) Int. Cl.
| | |
|---|---|
| *F16D 65/00* | (2006.01) |
| *B62D 21/18* | (2006.01) |
| *F16D 65/12* | (2006.01) |
| *F16D 55/00* | (2006.01) |
| *B60S 1/68* | (2006.01) |

(52) U.S. Cl.
CPC ....... *F16D 65/0037* (2013.01); *B62D 21/183* (2013.01); *F16D 65/0068* (2013.01); *F16D 65/0081* (2013.01); *F16D 65/12* (2013.01); *B60S 1/68* (2013.01); *F16D 2055/0037* (2013.01)

(58) Field of Classification Search
CPC ............. F16D 65/0081; F16D 65/0068; F16D 65/0037; F16D 65/12; B62D 21/183
See application file for complete search history.

(56) References Cited

U.S. PATENT DOCUMENTS

| | | | |
|---|---|---|---|
| 1,563,152 | A | 11/1925 | Bowen |
| 1,689,747 | A | 10/1928 | Olson |
| 1,757,771 | A | 5/1930 | Ideus |
| 1,877,005 | A | 9/1932 | Merklin |

(Continued)

FOREIGN PATENT DOCUMENTS

| | | |
|---|---|---|
| AR | 074919 | 2/2011 |
| AT | 291703 | 4/2005 |

(Continued)

OTHER PUBLICATIONS

Gauge Wheel Mud Scrapers for John Deere and Kinze Planters, by RK Products Inc. of East Moline, IL, dated Jan. 9, 2004; 4 pages.

(Continued)

*Primary Examiner* — James A English
(74) *Attorney, Agent, or Firm* — Faegre Drinker Biddle & Reath LLP

(57) ABSTRACT

A brake assembly for a wheel on a vehicle includes a brake disc, a caliper assembly operably coupled to the brake disc, a brake line fluidly coupled to the caliper assembly, and a brake shield positioned adjacent a portion of the caliper assembly. The brake shield includes a first arm positioned on a first side of a portion of the brake disc and a second arm positioned on a second side of the portion of the brake disc. The brake disc further includes a recess configured to receive a portion of the brake line.

25 Claims, 12 Drawing Sheets

(56) References Cited

U.S. PATENT DOCUMENTS

| | | | |
|---|---|---|---|
| 1,932,054 A | 10/1933 | Von Brethorst | |
| 2,157,253 A | 5/1939 | Yetter | |
| 2,189,253 A | 2/1940 | Schuman | |
| 2,242,608 A | 5/1941 | Graves | |
| 2,454,002 A | 11/1948 | Paluck | |
| 2,496,699 A | 2/1950 | Clark | |
| 3,214,786 A | 11/1965 | Butsch | |
| 3,222,708 A | 12/1965 | Butsch | |
| 3,433,328 A | 3/1969 | Swift | |
| 3,473,631 A | 10/1969 | Schmid | |
| 3,629,814 A | 12/1971 | Klein | |
| 3,801,129 A | 4/1974 | Kotzin | |
| 3,976,337 A | 8/1976 | Vaughn | |
| 3,998,295 A | 12/1976 | Martin | |
| 4,005,768 A | 2/1977 | Bubnash | |
| 4,155,601 A | 5/1979 | Ito | |
| 4,198,103 A | 4/1980 | Ward et al. | |
| 4,206,825 A | 6/1980 | Van Der Lely | |
| 4,226,308 A | 10/1980 | Nishiyama et al. | |
| 4,361,205 A | 11/1982 | Van Der Lely | |
| 4,473,139 A | 9/1984 | Oka et al. | |
| 4,487,286 A | 12/1984 | Van Der Lely | |
| 4,531,787 A | 7/1985 | Hart et al. | |
| 4,582,175 A | 4/1986 | Yanai | |
| 4,858,699 A | 8/1989 | Poltrock | |
| 5,226,703 A | 7/1993 | Norman | |
| 5,269,380 A | 12/1993 | Lofquist et al. | |
| 5,360,288 A | 11/1994 | O'Neill et al. | |
| 5,431,233 A | 7/1995 | Schmidt | |
| 5,464,075 A | 11/1995 | Everett | |
| 5,553,932 A | 9/1996 | Freeman | |
| 5,713,644 A | 2/1998 | Freeman | |
| 5,725,292 A | 3/1998 | Keedy et al. | |
| 5,967,630 A | 10/1999 | Sewell | |
| 6,007,166 A | 12/1999 | Tucker et al. | |
| 6,045,295 A | 4/2000 | Puchosic | |
| 6,089,684 A | 7/2000 | Bergstrom et al. | |
| 6,196,645 B1 | 3/2001 | Bergstrom et al. | |
| 6,543,586 B1 | 4/2003 | Willetts | |
| 6,578,934 B2 | 6/2003 | Ito et al. | |
| 6,776,698 B2 | 8/2004 | Pepin et al. | |
| 6,789,810 B2 | 9/2004 | Strong | |
| 6,830,075 B1* | 12/2004 | McKinney | F16L 3/1236 138/106 |
| 6,921,140 B2 | 7/2005 | Simons et al. | |
| 6,932,199 B2 | 8/2005 | Emmett et al. | |
| 6,991,073 B2 | 1/2006 | Macke et al. | |
| 7,090,433 B2 | 8/2006 | Searby | |
| 7,377,549 B2 | 5/2008 | Hasegawa et al. | |
| 7,380,628 B2 | 6/2008 | Bedard | |
| 7,451,857 B2 | 11/2008 | Hasegawa et al. | |
| 7,708,316 B2 | 5/2010 | Seku et al. | |
| 7,866,450 B2 | 1/2011 | Nakamura et al. | |
| 8,074,776 B2 | 12/2011 | Shimizu et al. | |
| 8,104,543 B2 | 1/2012 | Hesla | |
| 8,365,883 B2 | 2/2013 | Matsubayashi et al. | |
| 9,113,587 B2 | 8/2015 | Hesla | |
| 9,204,591 B2 | 12/2015 | Hesla | |
| 9,421,955 B2 | 8/2016 | Kuwabara et al. | |
| 9,902,388 B2* | 2/2018 | Heutchy | B60T 17/046 |
| 9,982,730 B2 | 5/2018 | Robson et al. | |
| 10,591,003 B2 | 3/2020 | Mansfield | |
| 2001/0045330 A1 | 11/2001 | Chiang et al. | |
| 2002/0190492 A1 | 12/2002 | Strong | |
| 2003/0040266 A1 | 2/2003 | Pepin et al. | |
| 2004/0173420 A1 | 9/2004 | Macke et al. | |
| 2005/0167179 A1 | 8/2005 | Hasegawa et al. | |
| 2006/0006623 A1 | 1/2006 | Leclair | |
| 2006/0049006 A1* | 3/2006 | Hasegawa | B62K 5/01 188/73.1 |
| 2007/0284856 A1 | 12/2007 | Shimizu et al. | |
| 2008/0053762 A1 | 3/2008 | Nakamura et al. | |
| 2008/0066662 A1 | 3/2008 | Hesla | |
| 2008/0238078 A1 | 10/2008 | Seki et al. | |
| 2009/0071770 A1 | 3/2009 | Bagge et al. | |
| 2010/0187052 A1 | 7/2010 | Matsubayashi et al. | |
| 2012/0192774 A1 | 8/2012 | Hesla | |
| 2014/0014377 A1 | 1/2014 | Hesla | |
| 2014/0197285 A1* | 7/2014 | Lucas | B60T 17/046 248/75 |
| 2015/0210234 A1* | 7/2015 | Kuwabara | F16C 11/06 180/346 |
| 2016/0113187 A1 | 4/2016 | Hesla | |
| 2016/0192571 A1 | 7/2016 | Hesla | |
| 2017/0305401 A1* | 10/2017 | Takenaka | F16L 3/01 |
| 2017/0370422 A1 | 12/2017 | Bessho et al. | |
| 2018/0363716 A1 | 12/2018 | Mansfield et al. | |

FOREIGN PATENT DOCUMENTS

| | | |
|---|---|---|
| AT | 391861 | 4/2008 |
| AT | 414624 | 12/2008 |
| AU | 2003238271 A1 | 6/2005 |
| AU | 2008200575 A1 | 10/2008 |
| AU | 2009238259 A1 | 8/2010 |
| BR | 7100962 | 1/1993 |
| BR | PI0212557 | 10/2004 |
| BR | PI0419208 | 1/2008 |
| BR | PI0704084 A | 4/2008 |
| BR | PI1000117 | 3/2011 |
| BR | 202013032790 | 10/2015 |
| CA | 1217151 A | 1/1987 |
| CA | 2396797 A1 | 2/2003 |
| CA | 2495399 A1 | 7/2005 |
| CA | 2627658 A1 | 9/2008 |
| CA | 2685697 A1 | 7/2010 |
| CA | 2811035 A1 | 10/2013 |
| CA | 2916541 A1 | 6/2016 |
| CN | 2551554 Y | 5/2003 |
| CN | 1654239 A | 8/2005 |
| CN | 100417536 C | 9/2008 |
| CN | 101786473 A | 7/2010 |
| CN | 202163423 | 3/2012 |
| CN | 104033514 | 9/2014 |
| CN | 204327813 | 5/2015 |
| DE | 1655367 | 7/1971 |
| DE | 2814252 | 10/1978 |
| DE | 4208381 A1 | 9/1993 |
| DE | 69016003 | 8/1995 |
| DE | 10243128 | 4/2003 |
| DE | 50202575 | 4/2005 |
| DE | 60324840 | 1/2009 |
| DE | 602004013055 | 5/2009 |
| DE | 602005023083 | 10/2010 |
| DE | 102010034667 A1 | 2/2012 |
| DE | 202014102912 U1 | 12/2014 |
| DE | 102014108935 A1 | 3/2015 |
| EP | 0200316 A1 | 11/1986 |
| EP | 0447714 A2 | 9/1991 |
| EP | 1430232 | 6/2004 |
| EP | 1559594 A2 | 8/2005 |
| EP | 1578625 | 9/2005 |
| EP | 1825162 | 8/2007 |
| ES | 2069707 | 5/1995 |
| ES | 2238632 | 9/2005 |
| ES | 2351664 | 2/2011 |
| FR | 1548102 | 11/1968 |
| FR | 2078705 | 11/1971 |
| FR | 2846614 A1 | 5/2004 |
| FR | 2901508 A1 | 11/2007 |
| GB | 190312795 | 7/1903 |
| GB | 0209012 | 1/1924 |
| GB | 1155336 A | 6/1969 |
| GB | 1589121 A | 5/1981 |
| GB | 2173267 A | 10/1986 |
| GB | 198926617 | 4/1992 |
| GB | 201206316 | 4/2012 |
| JP | 53-136484 | 10/1978 |
| JP | 58-032028 | 10/1978 |
| JP | 57-093639 | 6/1982 |
| JP | 59-167784 | 11/1984 |
| JP | 59-200820 A | 11/1984 |
| JP | 59-200824 A | 11/1984 |
| JP | 62-027716 | 7/1987 |

(56) References Cited

FOREIGN PATENT DOCUMENTS

| | | |
|---|---|---|
| JP | 63-042071 | 2/1988 |
| JP | 03-223532 A | 10/1991 |
| JP | 05-193457 A | 8/1993 |
| JP | 07-042845 | 2/1995 |
| JP | 2001-287685 | 10/2001 |
| JP | 2005-212698 A | 8/2005 |
| JP | 2006-069436 A | 3/2006 |
| JP | 2006-069437 A | 3/2006 |
| JP | 2006-071042 A | 3/2006 |
| JP | 2008-057707 A | 3/2008 |
| JP | 2008-247290 A | 10/2008 |
| JP | 4274169 B2 | 6/2009 |
| JP | 4343802 B2 | 10/2009 |
| JP | 2010-174923 A | 8/2010 |
| JP | 4516388 B2 | 8/2010 |
| JP | 4627404 B2 | 2/2011 |
| JP | 4737769 B2 | 8/2011 |
| JP | 4881780 B2 | 2/2012 |
| JP | 5285453 B2 | 9/2013 |
| JP | 2015-140168 A | 8/2015 |
| PT | 1559594 E | 11/2010 |
| WO | 98/03378 A1 | 1/1998 |
| WO | 03/25413 | 3/2003 |
| WO | 2005/056314 A1 | 6/2005 |
| WO | 2006/057581 A1 | 6/2006 |
| WO | 2013/153379 A1 | 10/2013 |
| WO | 2016/018909 | 2/2016 |

OTHER PUBLICATIONS

Ebert et al., Cover for a brake or a portion of a brake or a wheel of a vehicle, in particular brake cover plate, Mar. 12, 2015, EPO, DE 10 2014 108 935 A1, Machine Translation of Description (Year: 2015).

Images of Subaru mud scrapers available at https://www.google.com/search?q=subaru+mud+scrapers&tbm=isch&tbo=u&source=univ&sa=X&ved=0ahUKEwjFkZHy_erTAhVB4oMKHZ5HCJAQ7AklLg&biw=1342&bih=719#imgrc=z74B-v8NYbNR-M:&spf=1494613700602; available at least as early as May 12, 2017; 4 pages.

International Preliminary Report on Patentability issued by the European Patent Office, dated Jul. 31, 2019, for International Patent Application No. PCT/US2018/037439; 18 pages.

International Search Report of the International Searching Authority, dated Sep. 27, 2018, for International Patent Application No. PCT/US2018/037439; 7 pages.

Written Opinion of the International Searching Authority, dated Sep. 27, 2018, for International Patent Application No. PCT/US2018/037439; 16 pages.

Office Action issued by the China National Intellectual Property Administration, dated Nov. 4, 2020, for Chinese Patent Application No. 201880037666; 9 pages.

\* cited by examiner

US 11,193,548 B2

BRAKE ASSEMBLY SHIELD AND SCRAPER

CROSS-REFERENCE TO RELATED APPLICATION

The present application is a continuation of U.S. patent application Ser. No. 15/625,023, filed Jun. 16, 2017, titled "BRAKE ASSEMBLY SHIELD AND SCRAPER", the complete disclosure of which is expressly incorporated by reference herein.

FIELD OF THE DISCLOSURE

The present application relates to a utility vehicle and, more particularly, a shield and/or scraper for a brake assembly of the utility vehicle.

BACKGROUND OF THE DISCLOSURE

Vehicles that are able to traverse off-road conditions, such as utility vehicles and all-terrain vehicles, often drive through mud and dirt on various trails and terrain. However, the mud and dirt may accumulate on various portions of the wheels, such as on the wheel rims and near the brakes, such as the brake calipers or discs. Additionally, rocks and other debris may become dislodged and air-born as the vehicle drives along the trails and are able to contact portions of the wheels and brakes which can cause damage to the wheel and brake assemblies.

It is known that wheel scrapers may be used to at least remove an accumulation of mud and dirt on the tires. However, various wheels scrapers are not configured to prevent an accumulation of mud or contact from rocks at the wheel rim or the brakes. As such, there is a need for a scraper or shield that is configured to remove mud and dirt from the wheel rims and also prevent the mud and also rocks from contacting the brake assembly.

SUMMARY OF THE DISCLOSURE

In one embodiment, a brake assembly for a wheel on a vehicle comprises a brake disc, a caliper assembly operably coupled to the brake disc, and a brake shield positioned adjacent a portion of the caliper assembly. The brake shield includes a plurality of parallel projections extending radially outward relative to the caliper assembly.

In another embodiment, a brake assembly for a wheel comprises a brake disc and a caliper assembly operably coupled to the brake disc. The caliper assembly includes a caliper carrier portion and a brake pad portion. The brake assembly further comprises a brake line fluidly coupled to the brake disc and configured to move the brake pad portion of the caliper assembly relative to the brake disc. Additionally, the brake assembly comprises a brake shield positioned adjacent a portion of the caliper assembly and including a plurality of projections extending radially outward relative to an outer surface of the brake shield. At least one of the projections is angled relative to a rotational plane of the wheel.

In a further embodiment, a utility vehicle comprises a plurality of ground-engaging members including at least one front ground-engaging member and at least one rear ground-engaging member, a frame supported by the plurality of ground-engaging members, and a powertrain assembly configured to provide motive power to at least a portion of the plurality of ground-engaging members. Additionally, the utility vehicle comprises a brake assembly operably coupled to the at least one front ground-engaging member and including a brake disc, a caliper assembly, and a brake shield positioned adjacent a portion of the caliper assembly. The brake shield includes a plurality of projections extending radially outward relative to an outer surface of the brake shield.

In another embodiment, a brake assembly for a wheel comprises a brake disc, a caliper assembly operably coupled to the brake disc, a brake line fluidly coupled to the caliper assembly, and a brake shield positioned adjacent a portion of the caliper assembly. The brake shield includes a first arm positioned on a first side of a portion of the brake disc and a second arm positioned on a second side of the portion of the brake disc. The brake disc further includes a recess configured to receive a portion of the brake line.

In a further embodiment, a utility vehicle comprises a plurality of ground-engaging members including at least one front ground-engaging member and at least one rear ground-engaging member. Each of the plurality of ground-engaging members includes a rim. The utility vehicle also comprises a frame supported by the plurality of ground-engaging members, a powertrain assembly configured to provide motive power to at least a portion of the plurality of ground-engaging members, and a brake assembly operably coupled to the at least one front ground-engaging member. The brake assembly includes a brake disc, a caliper assembly, a brake line fluidly coupled to the caliper assembly, and a brake shield coupled to the caliper assembly. The brake shield has a scraping surface configured to remove accumulations of debris from the brake disc.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Figure 1:
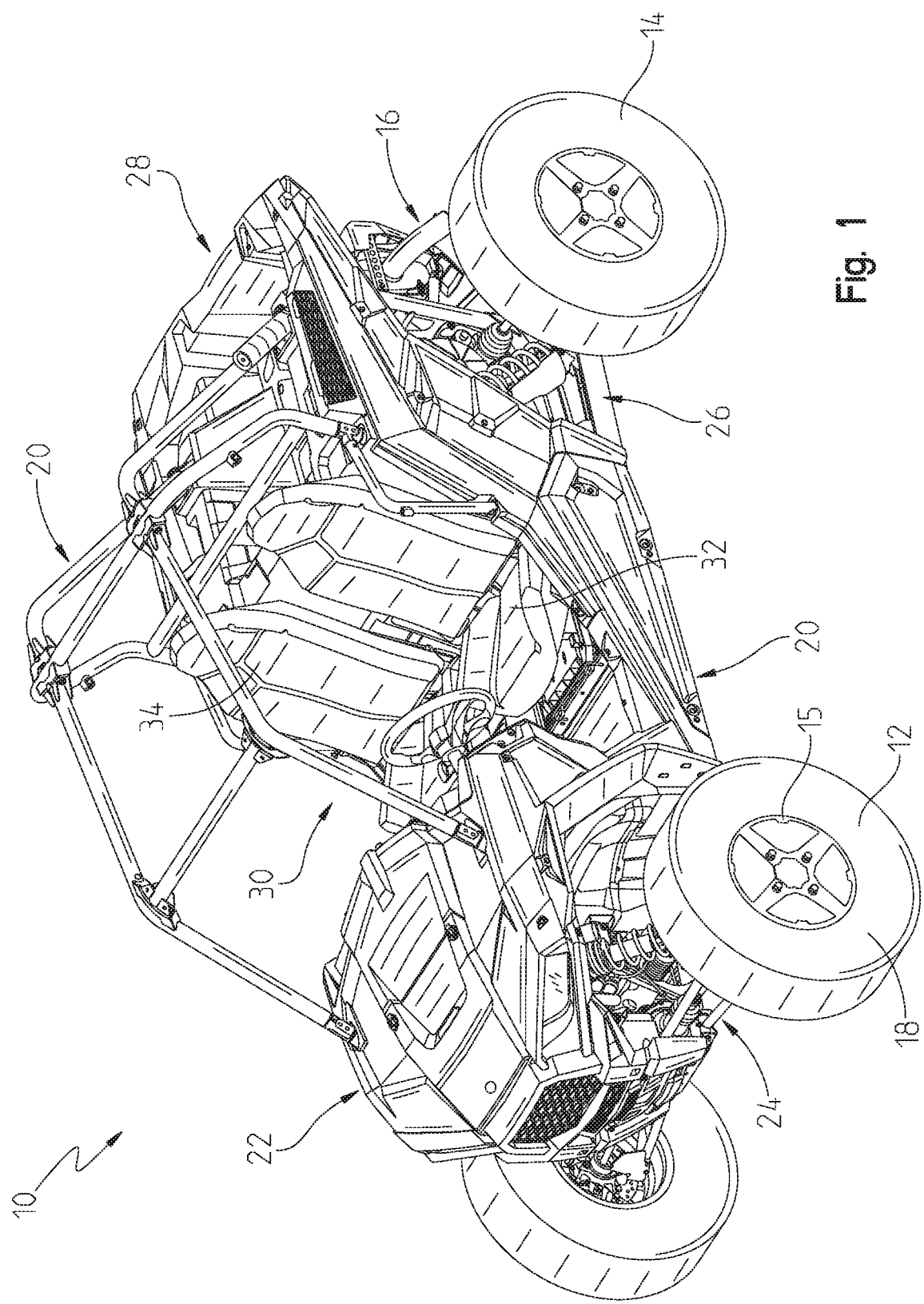
FIG. 1 is a front left perspective view of a utility vehicle of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Referring to FIG. 1, an illustrative embodiment of a utility vehicle 10 is shown which is configured to traverse a variety of terrains, including mud, rocks, dirt, and other trail or off-road conditions. Vehicle 10 includes a plurality of ground-engaging members, including front ground-engaging members 12 (e.g., front wheels) and rear-ground engaging members 14 (e.g., rear wheels), a powertrain assembly 16, a frame 20, a plurality of body panels 22 coupled to frame 20, a front suspension assembly 24, a rear suspension assembly 26, and a rear cargo area 28. In one embodiment, one or more ground-engaging members 12, 14 may be replaced with tracks, such as the PROSPECTOR II tracks available from Polaris Industries. Inc. located at 2100 Highway 55 in Medina, Minn. 55340, or non-pneumatic tires as disclosed in any of U.S. Pat. No. 8,109,308, filed on Mar. 26, 2008 (Attorney Docket No. PLR-09-25369.02P); U.S. Pat. No. 8,176,957, filed on Jul. 20, 2009 (Attorney Docket No. PLR-09-253710.01P); and U.S. Pat. No. 9,108,470, filed on Nov. 17, 2010 (Attorney Docket No. PLR-09-25375.03P); and U.S. Patent Application Publication No. 2013/0240272, filed on Mar. 13, 2013 (Attorney Docket No. PLR-09-25201.02P), the complete disclosures of which are expressly incorporated by reference herein. Vehicle 10 may be referred to as a utility vehicle ("UV"), an all-terrain vehicle ("ATV"), or a side-by-side vehicle ("SxS") and is configured for travel over various terrains or surfaces. More particularly, vehicle 10 may be configured for military, industrial, agricultural, or recreational applications.

Referring still to FIG. 1, vehicle 10 includes an operator area 30 supported by frame 20, and which includes seating for at least an operator and a passenger. Illustratively, one embodiment of vehicle 10 includes an operator seat 32 and a front passenger seat 34. More particularly, operator seat 32 and front passenger seat 34 are in a side-by-side arrangement. Operator seat 32 includes a seat bottom, illustratively a bucket seat, and a seat back. Similarly, front passenger seat 34 includes a seat bottom, illustratively a bucket seat, and a seat back. Additional details of vehicle 10 may be disclosed in U.S. patent application Ser. No. 14/051,700, filed Oct. 11, 2013 (Attorney Docket No. PLR-15-25448.04P), the complete disclosure of which is expressly incorporated by reference herein.

Figure 2:
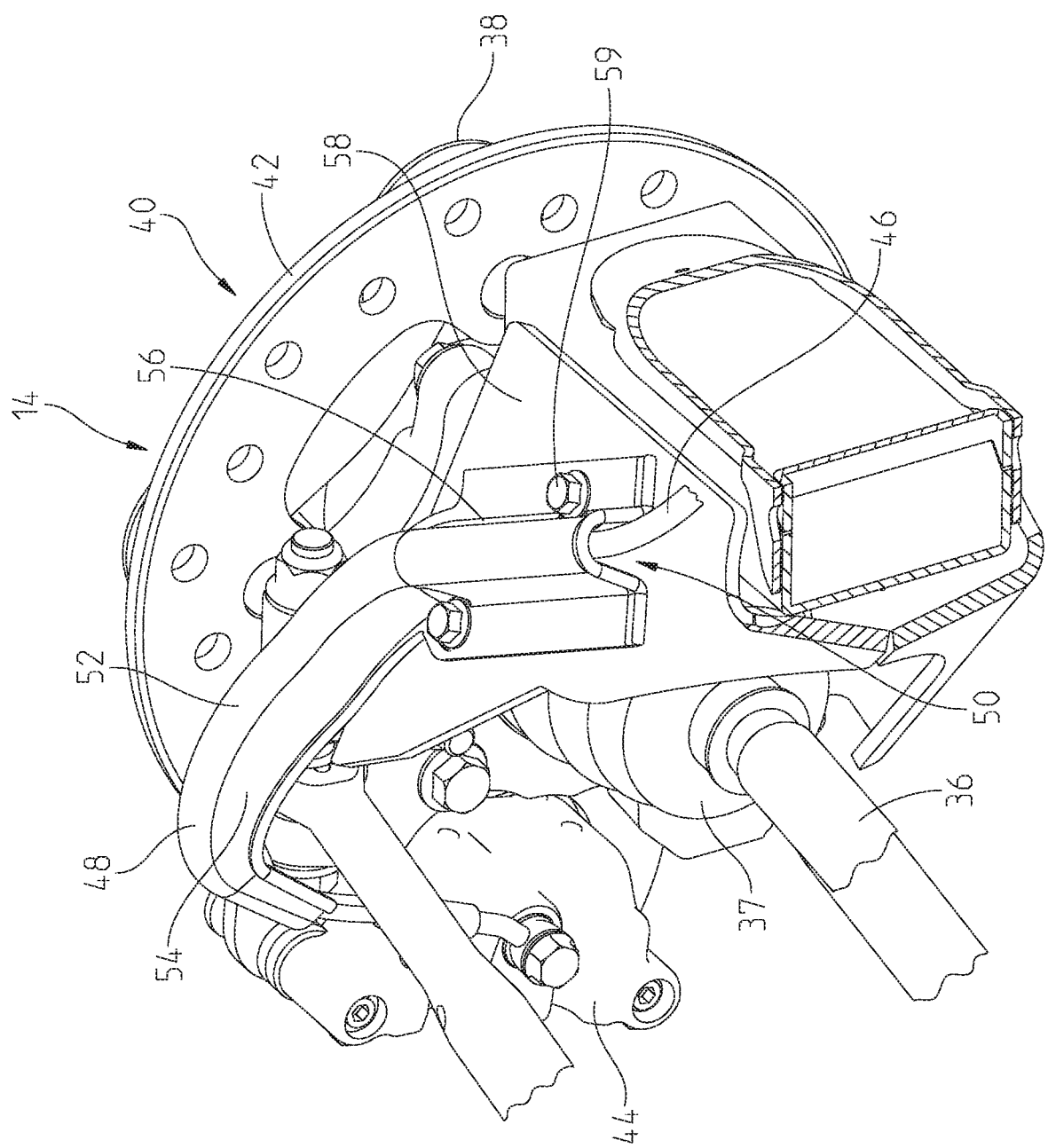
FIG. 2 is a front right perspective view of a rear brake assembly of the vehicle of FIG. 1.
Figure 3:
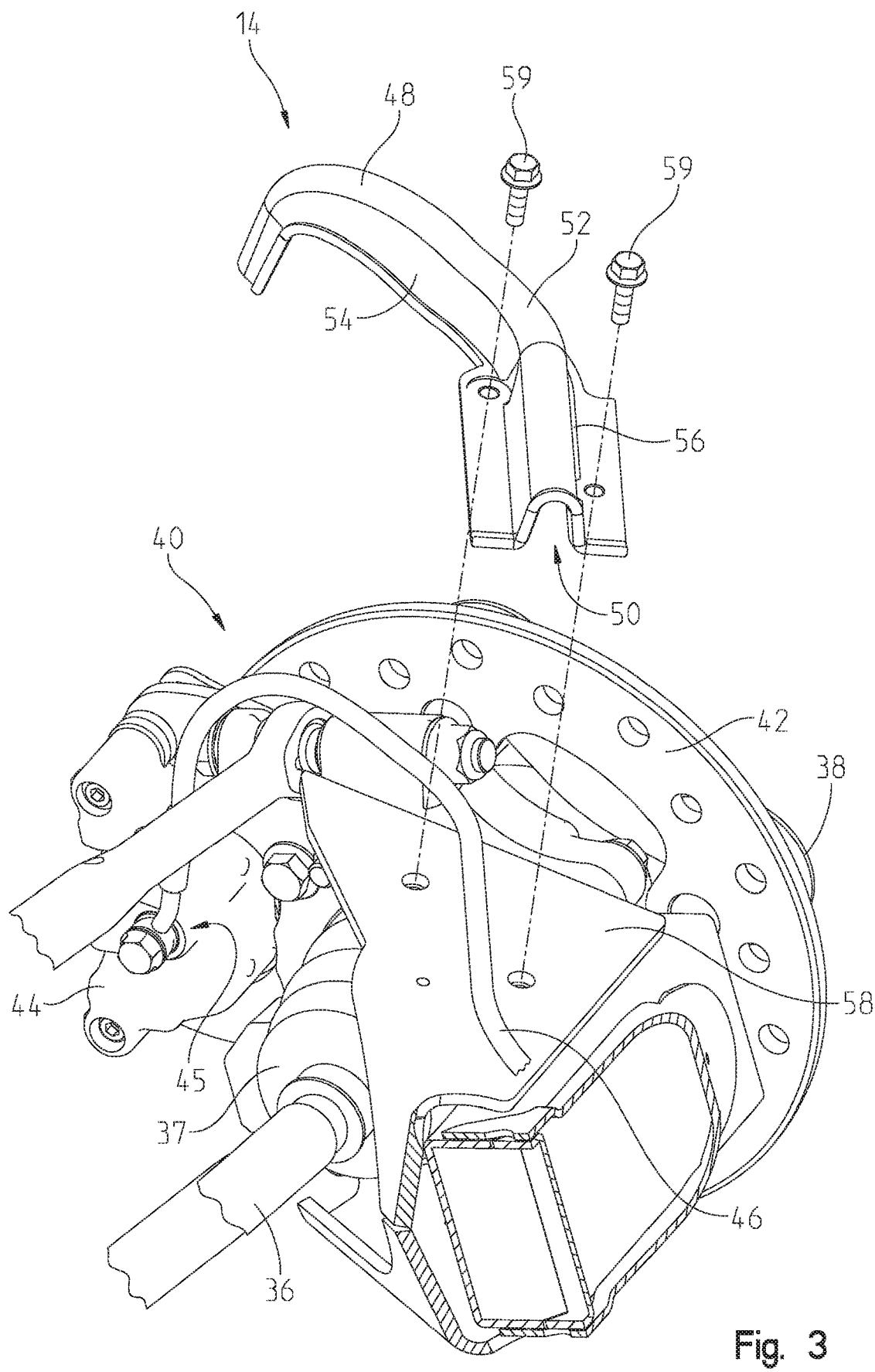
FIG. 3 is an exploded view of a rear brake line shield and the rear brake assembly of FIG. 2.

Referring to FIGS. 2 and 3, a portion of one of rear wheels 14 is shown. Illustratively, a rear half shaft 36, which may include a CV boot 37, is coupled to a wheel and is configured to rotate with rear wheel 14 while vehicle 10 is moving. Rear wheel 14 also includes a hub 38 which may be configured to couple with a rear brake assembly 40. Rear brake assembly 40 includes at least a brake disc 42, a caliper assembly 44, and a brake line 46 extending between caliper assembly 44 and a brake master cylinder (not shown). Illustratively, brake line 46 is fluidly coupled to a port 45 of caliper assembly 44. In operation, if the operator actuates rear brake assembly 40, the brake master cylinder flows brake fluid (e.g., hydraulic fluid) through brake line 46 to port 45 of caliper assembly 44 to close a portion of caliper assembly 44 (e.g., brake pads) against brake disc 42.

Because vehicle 10 is a utility vehicle, vehicle 10 may encounter mud, rocks, dirt, and debris while operating. However, to protect brake line 46 from accumulations of mud and dirt and/or to prevent air-born rocks from contacting brake line 46, brake assembly 40 also may include a rear brake line shield 48, as shown in FIGS. 2 and 3. Rear brake line shield 48 may define a generally U-shaped configuration such that brake line 46 is received within a concave or downward-facing recess 50 thereof. Illustratively, rear brake line shield 48 includes an upper or outer portion 52, a first side portion 54, and a second side portion 56 which all cooperate together to define the U-shape thereof. Recess 50 is positioned intermediate first and second side portions 54, 56 and is positioned under upper portion 52, thereby defining a channel for brake line 46. In this way, brake line 46 is concealed on three sides from any mud or dirt at rear wheel 14. Additionally, if rocks are kicked up or otherwise become air-born during operation of vehicle 10, the rocks are prevented from contacting brake line 46 by rear brake line shield 48. Also, because rear brake line shield 48 is positioned at least partially radially outwardly relative to brake disc 42 and adjacent a rim of rear wheel 14, upper portion 52 may also be configured to scrape or otherwise remove accumulations of mud or dirt at the rim of rear wheel 14.

Rear brake line shield 48 may be positioned adjacent brake disc 42 only or may extend along the entirety of brake line 46 between caliper assembly 44 and the brake master cylinder. In this way, rear brake line shield 48 both protects brake line 46 from wear and provides a routing channel for at least a portion of brake line 46. In one embodiment, rear brake line shield 48 may include various bends or curves to accommodate the routing of brake line 46. Rear brake line shield 48 may be comprised of a plurality of components coupled together or may be comprised as a single, integral component. In one embodiment, rear brake line shield 48 is comprised of a molded plastic material. As shown in FIGS. 2 and 3, rear brake line shield 48 is coupled to a bracket 58 of rear wheel 14 or rear suspension assembly 26 with fasteners 59, illustratively bolts.

Figure 4:
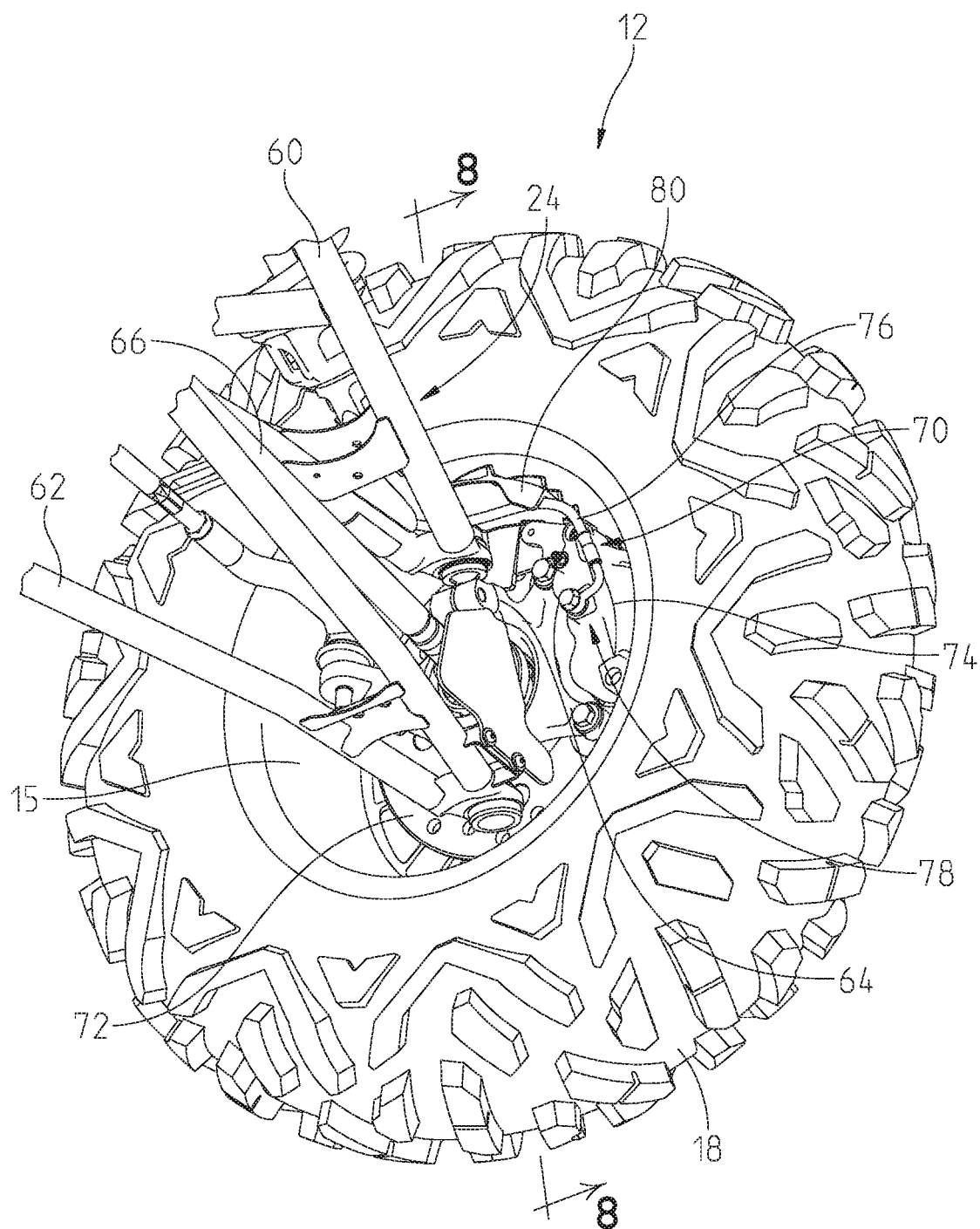
FIG. 4 is a front right perspective view of a front wheel assembly of the vehicle of FIG. 1.
Figure 5:
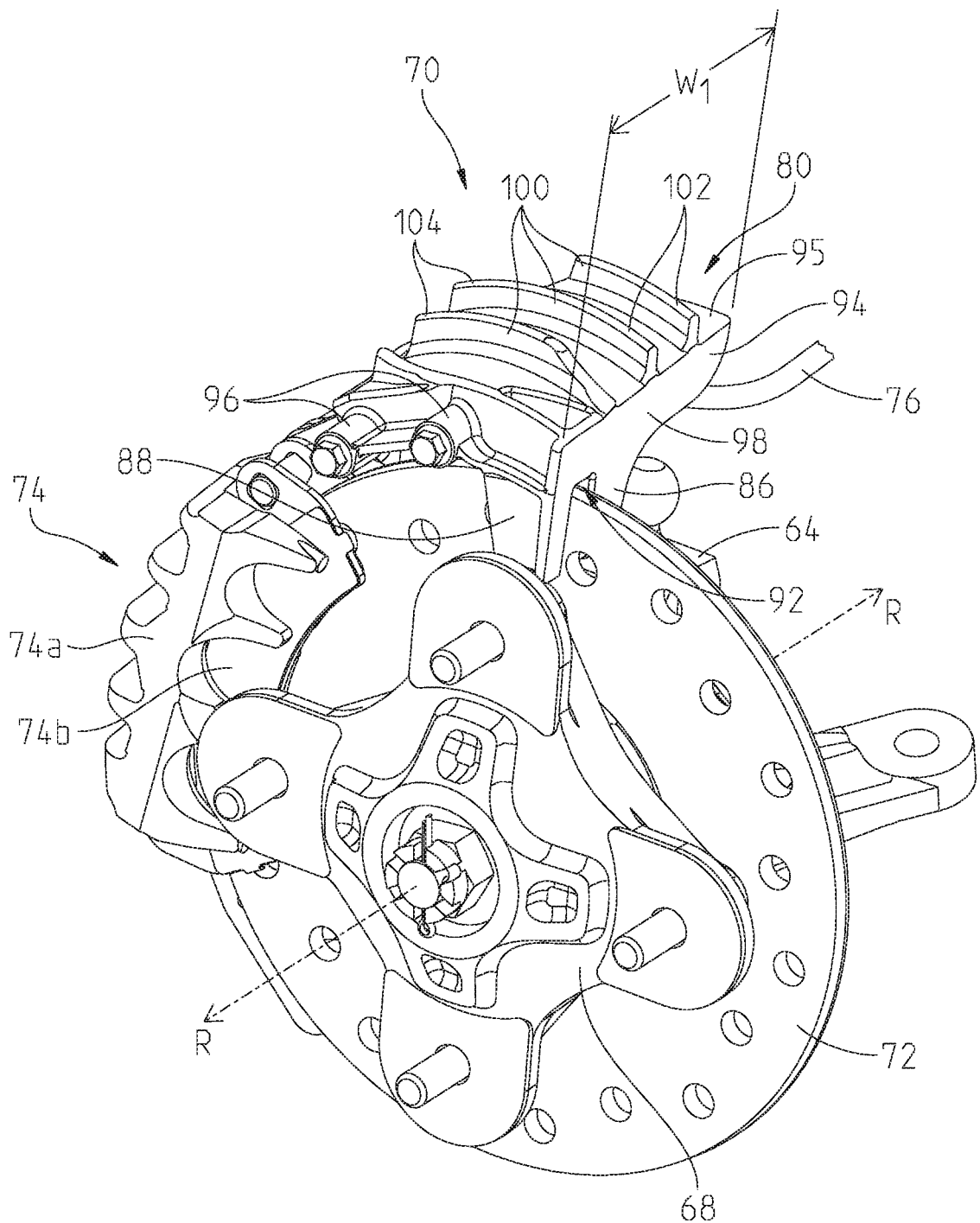
FIG. 5 is a rear left perspective view of a brake assembly of the front wheel assembly of FIG. 4.
Figure 6:
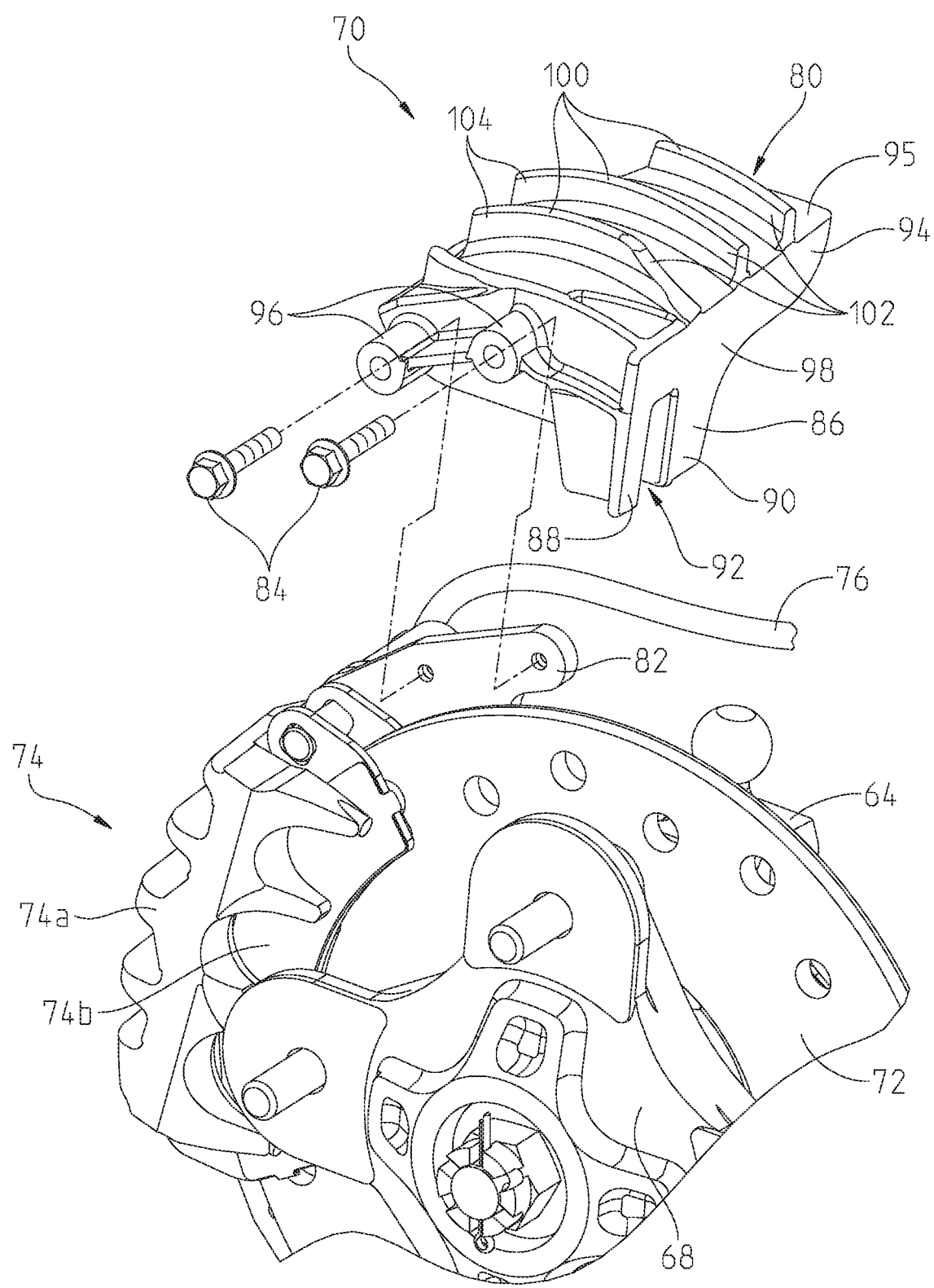
FIG. 6 is an exploded view of a brake shield and the brake assembly of FIG. 5.
Figure 7:
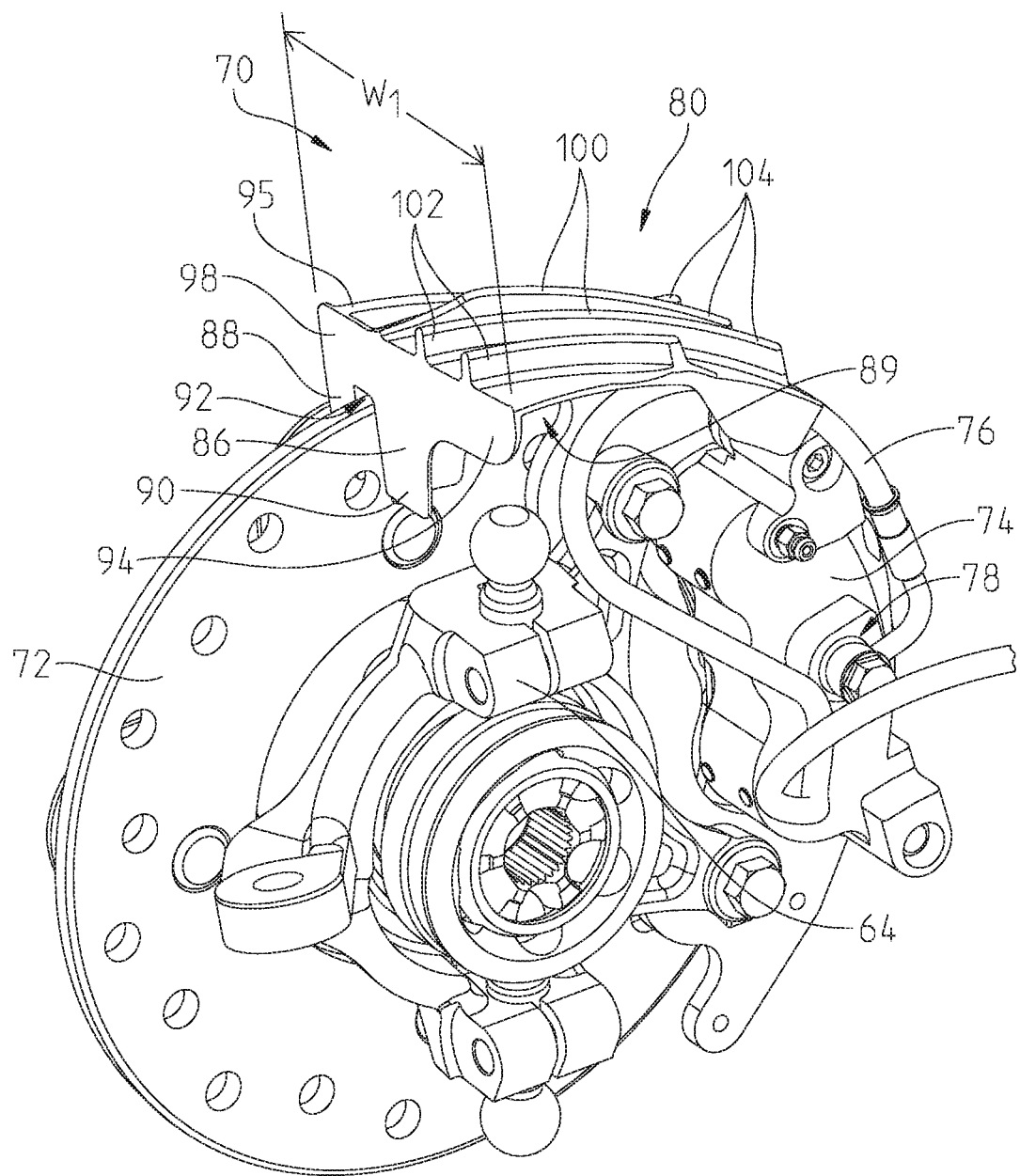
FIG. 7 is a rear right perspective view of the brake shield of FIG. 5.

Referring to FIGS. 4-9, front wheel 12 and a portion of front suspension assembly 24 are shown. As shown best in FIG. 8, front wheel 12 is comprised of at least a rim 15 and a tire 18. Front wheel 12 is operably coupled to front suspension assembly 24 which includes an upper alignment arm 60 and a lower alignment arm 62 both of which are operably coupled to a portion of front wheel 12, illustratively a knuckle 64. A half shaft 66 is positioned vertically intermediate upper and lower alignment arms 60, 62 and is configured to rotate with front wheel 12 when vehicle 10 is moving. As shown in FIG. 5, front wheel 12 also includes a wheel hub 68 coupled to a front brake assembly 70.

Front brake assembly 70 includes at least a brake disc 72, a caliper assembly 74, and a brake line 76 extending between caliper assembly 74 and the brake master cylinder (not shown). Illustratively, brake line 76 is fluidly coupled to a port 78 of caliper assembly 74. Caliper assembly 74 is defined by at least a caliper carrier or mount 74a and a brake pad portion 74b. In operation, if the operator actuates front brake assembly 70, the brake master cylinder flows brake fluid (e.g., hydraulic fluid) through brake line 76 to port 78 of caliper assembly 74 to move brake pad portion 74b of caliper assembly 74 against brake disc 72.

Because vehicle 10 is a utility vehicle, vehicle 10 may encounter mud, rocks, dirt, and debris while operating. However, to protect brake line 76 from accumulations of mud and dirt and/or to prevent rocks from contacting brake line 76, front brake assembly 70 further includes a front brake shield 80 which may be comprised of a metallic materials, for example die-cast aluminum. Front brake shield 80 is positioned radially outward from brake disc 72 and is positioned adjacent caliper assembly 74. Illustratively, front brake shield 80 is positioned rearward of caliper assembly 74, however, front brake shield 80 may be positioned in any configuration relative to caliper assembly 74. In one embodiment, front brake shield 80 is removably coupled to a caliper bracket 82 with fasteners 84, illustratively bolts. Caliper bracket 82 may be a portion of wheel 12, a portion of front suspension assembly 24, or may define a portion of caliper assembly 74 but, in the illustrative embodiment is separate from front brake shield 80.

Figure 8:
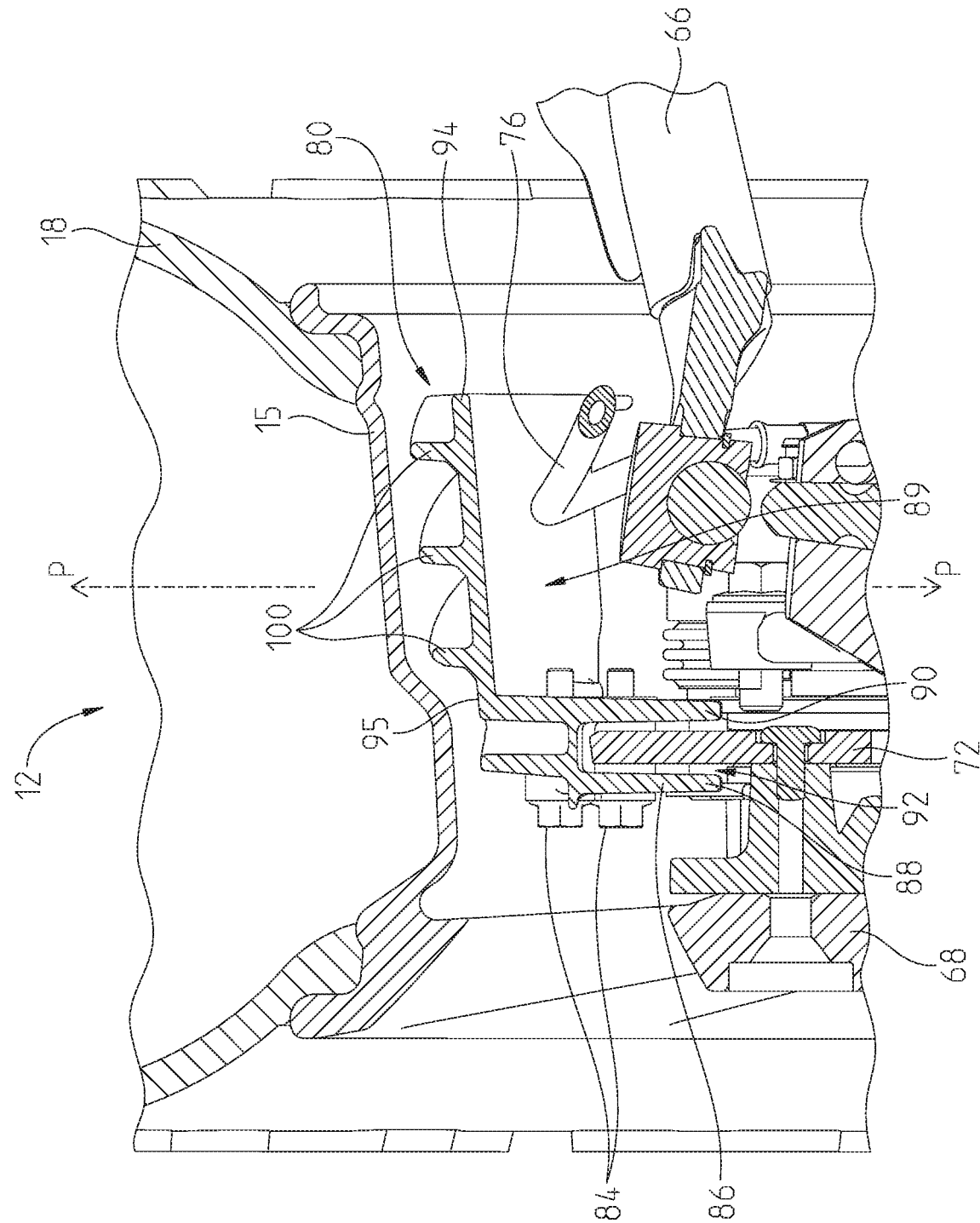
FIG. 8 is a cross-sectional view of the front wheel assembly of FIG. 4, taken along line 8-8 of FIG. 4.

Front brake shield 80 includes a lower portion 86 with a first arm 88 and a second arm 90 which cooperate together to define a recess 92. Recess 92 is configured to receive a portion of brake disc 72. Illustratively, lower portion 86 may positioned around a portion of brake disc 72 which is vertically above an axis of rotation R of front wheel 12 (FIG. 5), however, lower portion 86 may be positioned around brake disc 72 at any position. While a portion of brake disc 72 is received within recess 92 of front brake shield 80, first and second arms 88, 90 of front brake shield 80 may not contact brake disc 72, as shown in FIG. 8. However, arms 88, 90 function as a rotor scraper to remove any accumulations of mud, dirt, and/or debris from brake disc 72.

Front brake shield 80 also includes an upper portion 94 which may be integral with lower portion 86 or may be separate therefrom and coupled thereto. A planar surface 98 may define the rearward extent of front brake shield 80 and extends radially and continuously between lower portion 86 and upper portion 94. Upper portion 94 of front brake shield 80 includes bores 96 for receiving fasteners 84.

Upper portion 94 also includes a plurality of projections 100, illustratively fins or blades which define scraping surfaces, extending radially outward from an outer surface 95 of upper portion 94. Projections 100 may be comprised of the same material as front brake shield 80, for example a rigid polymeric material and/or a metallic material, or may be comprised of a different material than upper and/or lower portions 94, 86 of front brake shield 80. Illustratively, front brake shield 80 includes at least three projections 100, however, any number of projections 100 may be included.

Figure 9:
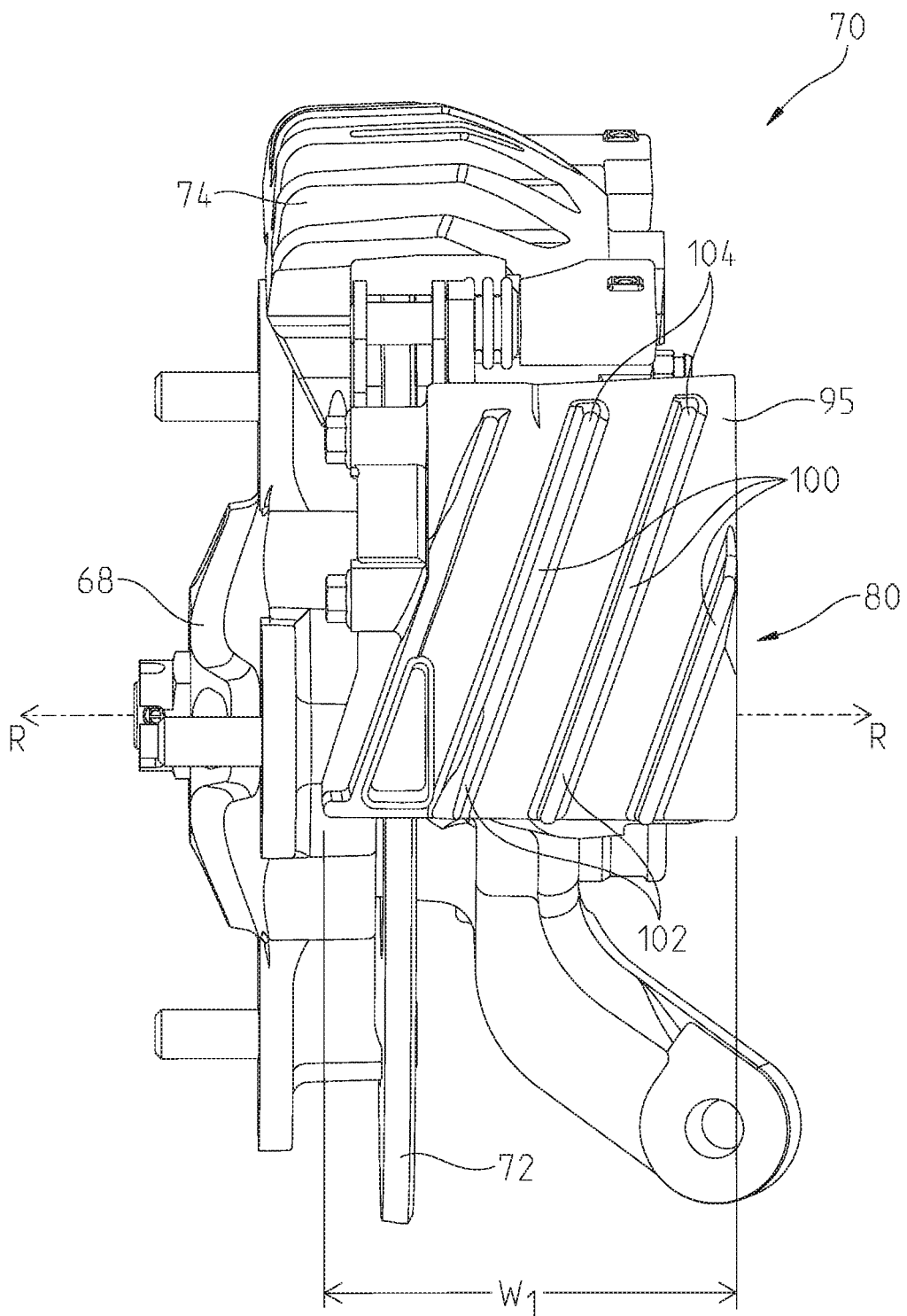
FIG. 9 is a top view of the brake shield of FIG. 7.

Referring to FIGS. 8 and 9, projections 100 are laterally aligned in a transverse direction of vehicle 10 generally parallel to axis of rotation R (FIG. 5). Projections 100 also are angled relative to axis of rotation R (FIG. 5). More particularly, a rearward end 102 of each projection 100 is positioned laterally outwardly from a corresponding forward end 104 such that each projection 100 is angled inwardly as projection 100 extends forward. As such, projections 100 are not perpendicular to axis of rotation R (FIG. 5) and, instead, are angled relative to axis of rotation R and a rotation plane of front wheel 12, which includes vertical axis P (FIG. 8). As disclosed herein, projections 100 are configured to remove accumulations of mud, dirt, and debris from rim 15 (FIG. 8) of front wheel 12. And, due to the angling of projections 100 inwardly at forward ends 104, any mud, dirt, and debris that is removed from rim 15 is pushed or swept towards the inside of front wheels 12 to fall away from vehicle 10.

In operation, as front wheels 12 rotate, projections 100 and planar surface 98 cooperate together to remove mud, dirt, and debris from rim 15. More particularly, planar surface 98 may initially contact any accumulations of mud, dirt, or debris at rim 15. Any accumulations of mud, for example, are then pushed inwardly or outwardly off of planar surface 98 to fall away from front wheels 12. In addition to planar surface 98, as discussed herein, projections 100 also remove mud, dirt, and debris from rim 15 and, because projections 100 are closer to rim 15 than planar surface 98, projections 100 facilitate the removal of smaller accumulations of mud, for example, on rim 15. In this way, both planar surface 98 and projections 100 define scraping surfaces of front brake shield 80 to remove accumulations of mud, dirt, and debris which prevents damage to components of brake assembly 70 and proper operation of front wheels 12 and brake assembly 70.

Referring still to FIGS. 4-9, front brake shield 80 has a transverse width W1 parallel to axis of rotation R (FIG. 5) which is configured to conceal the entirety of caliper assembly 74 (in a rear view), thereby preventing any rocks, dirt, or debris that may become air-born from contacting caliper assembly 74. Additionally, transverse width W1 of front brake shield 80 is configured to conceal at least a portion of brake line 76 which also prevents accumulations of mud and dirt on brake line 76 and further prevents rocks from contacting brake line 76. Illustratively, brake line 76 is positioned within a recessed portion or pocket 89 of front brake shield 80. As such, front brake shield 80 is sized and positioned to inhibit rocks, dirt, mud, and debris from contacting caliper assembly 74 and brake line 76.

Therefore, front brake shield 80 is configured for multiple purposes. First, due to the position of front brake shield 80 relative to caliper assembly 74, front brake shield 80 is configured to prevent rocks or other debris from contacting and possibly damaging caliper assembly 74. Additionally, transverse width W1 of front brake shield 80 conceals both the entire width of caliper assembly 74 and at least a portion of brake line 76, further preventing accumulations of mud and dirt on brake line 76 and also preventing rocks or debris from contacting and possibly damaging brake line 76. Also, projections 100 of front brake shield 80 are configured to remove or scrape away any accumulations of mud, dirt, or debris along rim 15 of front wheel 12. The angled configuration of projections 100 relative to both the rotational plane of front wheel 12 and axis of rotation R allows any mud, dirt, or debris at rim 15 to move inwardly and fall away from vehicle 10.

Figure 10:
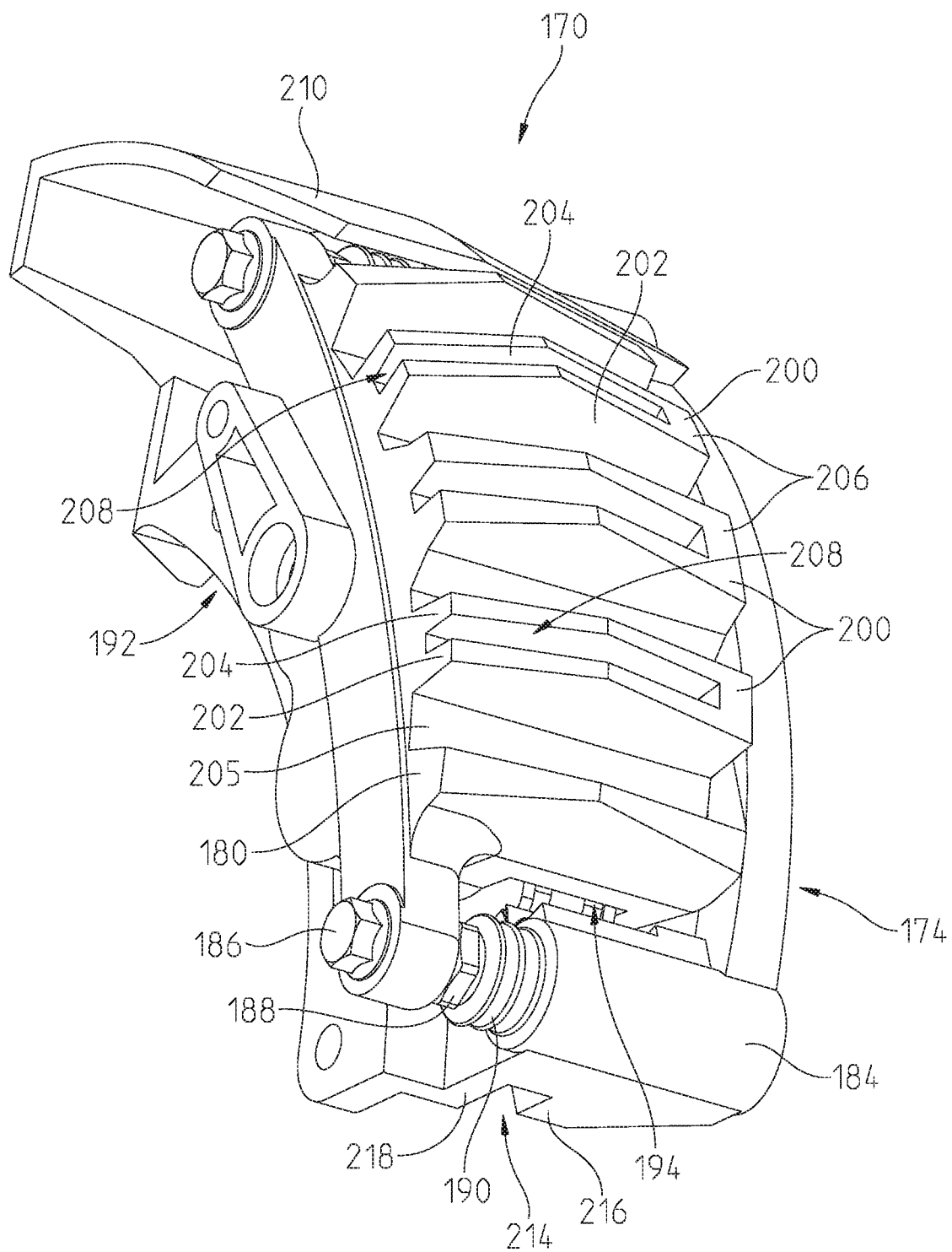
FIG. 10 is a front right perspective view of an alternative brake assembly of the front wheel assembly, including an integrated brake caliper shield and scraper.
Figure 11:
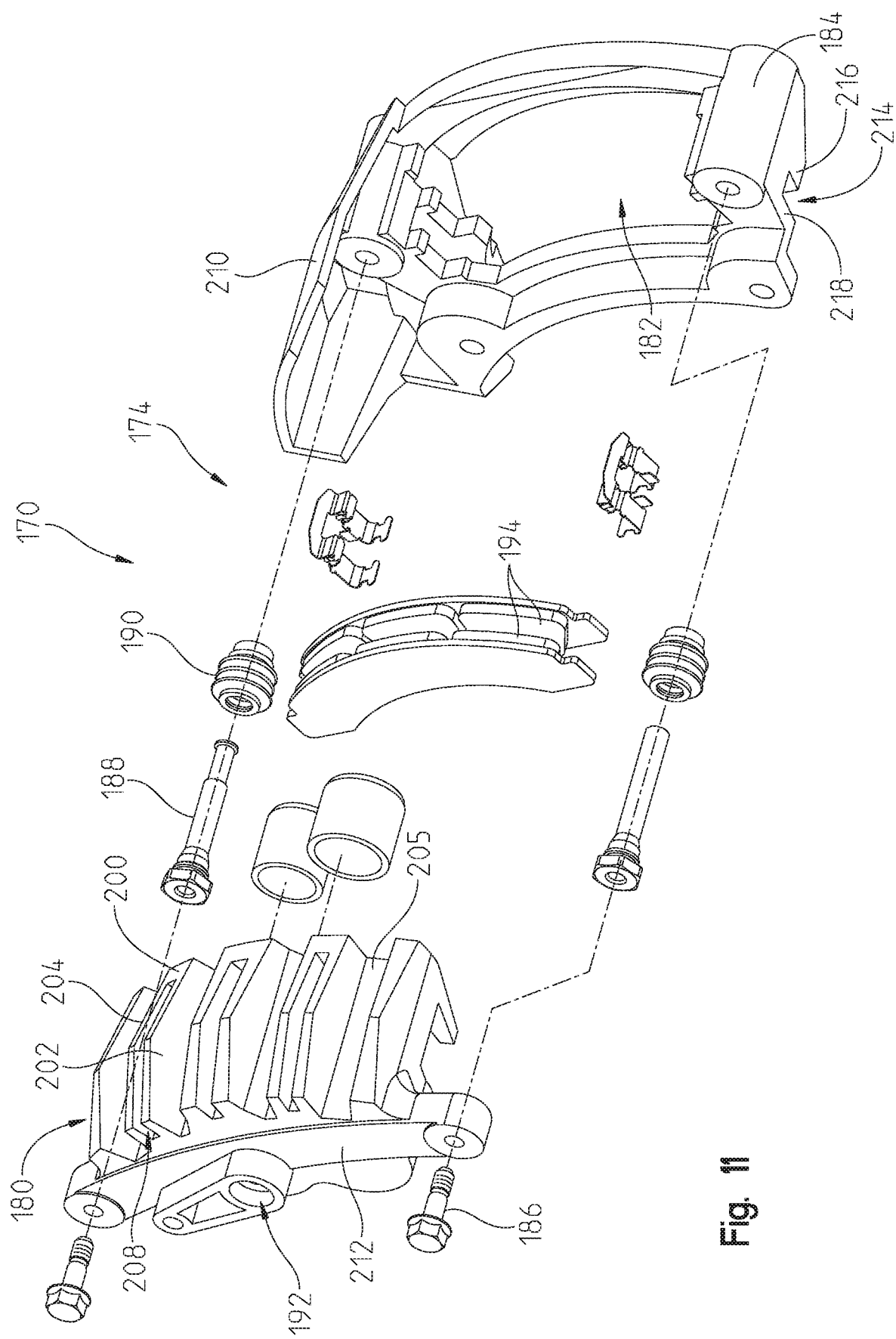
FIG. 11 is an exploded view of the alternative brake assembly and brake caliper shield and scraper of FIG. 10.
Figure 12:
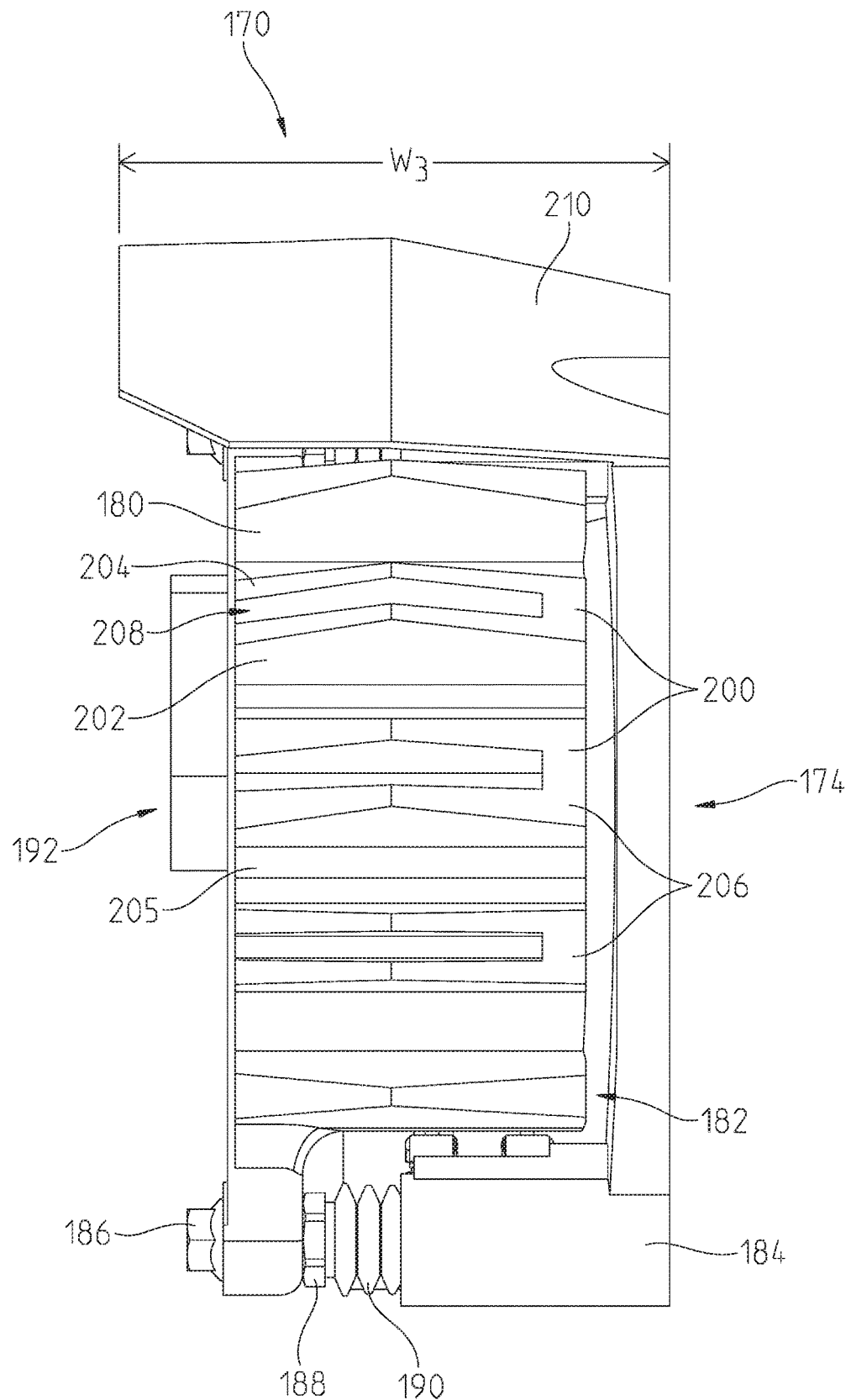
FIG. 12 is a front view of the alternative brake assembly and brake caliper shield and scraper of FIG. 10.

Referring to FIGS. 10-12, an alternative embodiment front brake assembly is shown as 170. Front brake assembly 170 of FIGS. 10-12 includes brake disc 72 (FIG. 5), an alternative caliper assembly 174, and brake line 76 (FIG. 5). Caliper assembly 174 includes a caliper body 180 coupled to a caliper carrier or mount 184. Caliper carrier 184 is configured to support brake pads 194. Illustratively, caliper body 180 is positioned within a recessed portion 182 of caliper carrier 184 and is coupled to a caliper carrier 184 with fasteners 186, 188. Additionally, seals or dust boots 190 may be positioned intermediate a portion of caliper carrier 184 and caliper body 180 and configured to cover at least a portion of fasteners 186 and/or 188. More particularly, caliper body 180 may include an integrated caliper bracket 212 which is configured to receive fasteners 186 when coupling caliper body 180 to caliper carrier 184. In this way, as opposed to front brake shield 80 of FIG. 6 with a separate caliper bracket 82, the illustrative embodiments of FIGS. 10-12 include an integrated combination of caliper bracket 212 and caliper body 180.

Caliper carrier 184 includes a brake shield 210, illustratively a scraping surface, configured to be positioned adjacent rim 15 (FIG. 8) of front wheels 12 to remove accumulations of mud, dirt, and debris therefrom. More particularly, brake shield 210 is coupled to caliper carrier 184 and, illustratively, brake shield 210 is integrally coupled with caliper carrier 184 such that brake shield 210 and caliper carrier 184 may be defined as a single component with brake shield 210 defining a rearward portion thereof. Brake shield 210 extends in a rotational direction of front wheels 12 and also has a width W3 (FIG. 12) which extends in a generally parallel direction to axis of rotation R (FIG. 9). Width W3 of brake shield 210 is greater than a width of caliper body 180 and, therefore, brake pads 194 positioned therein.

In operation, as front wheels 12 rotate, brake shield 210 dislodges accumulations of mud, dirt, and debris on rim 15 and the dislodged mud, dirt, or debris moves inwardly or outwardly to fall away from front wheels 12. It may be appreciated that brake shield 210 is positioned upstream of caliper body 180 in a forward rotation direction of front wheels 12 and brake pads 194 such that mud, dirt, and debris are removed from rim 15 before rim 15 rotates to the position of caliper body 180 and brake pads 194. In this way, brake shield 210 inhibits dirt and mud at the location of brake pads 194.

Additionally, caliper carrier 184 includes a recess or slot 214 configured to receive a portion of brake disc 72 (FIG. 4). Recess 214 is defined by first and second arms 216, 218. As with recess 92 (FIG. 8), arms 216, 218 do not contact brake disc 72 but inhibit dirt, mud, and debris from contacting brake disc 72 at a position adjacent brake pads 194. Additionally, if brake disc 172 does include mud or dirt thereon, arms 216, 218 may remove the mud or dirt during rotation of front wheels 12 upstream of brake pads 194 in a forward rotation direction of front wheels 12.

As shown in FIGS. 10-12, caliper body 180 may include a fluid port 192 which is fluidly coupled to brake line 76 (FIG. 7) such that brake fluid (e.g., hydraulic) may flow between caliper assembly 174 and the brake master cylinder (not shown). In this way, the brake fluid within brake line 76 is configured to operate caliper assembly 174 to move brake pads 194 (FIG. 11) relative to brake disc 72 (FIG. 5).

Caliper body 180 also includes a plurality of ribs 200 extending radially outward from an outer surface 205 of caliper body 180 and relative to brake shield 210. Ribs 200 are configured to provide structural support to caliper body 180. More particularly, the configuration of ribs 200 increases the structural stiffness and rigidity of caliper body 180 such that caliper carrier 180 does not bend or flex when subjected to cyclical fatigue caused by the pressurized brake fluid flowing therein. In this way, less brake fluid may be needed for proper operation of brake assembly 170 because, due to the configuration of ribs 200, caliper body 180 retains its shape when the pressurized brake fluid flows into fluid port 192 and does not flex during flow of the pressurized brake fluid.

Illustratively, each rib 200 generally defines a U-shape formed by a first arm 202, a second arm 204, and an outer connecting portion 206. A recess 208 is positioned intermediate arms 202, 204 and laterally inward from outer connecting portion 206. Each rib 200 is spaced apart from adjacent ribs 200 in a parallel configuration.

It may be understood that both caliper assemblies 74, 174 may include a suspension mounting portion for mounting to at least one component of front suspension assembly 24. However, this suspension mounting portion of caliper assemblies 74, 174 may be configured to couple with additional components to allow for additional functionality on vehicle 10 without increasing the weight or number of components. For example, as discussed herein, the suspension mounting portions of caliper assemblies 74, 174 may be coupled to front brake shield 80 and/or the suspension mounting portions may be coupled to a rotor scraper, a routing component(s) for brake lines, and/or a brush guard to protect the CV boot of the half shafts.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A brake assembly for a wheel, comprising:
    a brake disc;
    a caliper assembly operably coupled to the brake disc and including a caliper carrier portion and a brake pad portion;
    a brake line fluidly coupled to the caliper assembly and configured to move the brake pad portion of the caliper assembly relative to the brake disc; and
    a brake shield positioned adjacent a portion of the caliper assembly, wherein the brake line is positioned within a recessed portion of the brake shield and the brake shield extending laterally across a portion of the brake disc.

2. The brake assembly of claim 1, the brake shield further comprising at least one projection extending radially outward from an outer surface of the brake shield.

3. The brake assembly of claim 2, wherein the at least one projection is generally parallel to an axis of rotation of the wheel.

4. The brake assembly of claim 2, wherein the at least one projection is angled relative to an axis of rotation of the wheel.

5. The brake assembly of claim 2, wherein the at least one projection comprises a plurality of projections and wherein each of the plurality of projections is parallel to each other at an outer portion of the brake shield.

6. The brake assembly of claim 1, further comprising a brake line shield, wherein the brake line is positioned within a recess of the brake line shield.

7. The brake assembly of claim 6, wherein the brake line shield is u-shaped.

8. The brake assembly of claim 1, wherein the brake shield is removably coupled to the caliper assembly.

9. The brake assembly of claim 1, wherein the brake shield is integral with the caliper carrier of the caliper assembly.

10. A method for manufacturing a brake assembly, the method comprising:
    coupling a caliper assembly to a brake disc, the caliper assembly comprising a caliper carrier portion and a brake pad portion;
    coupling a brake line to the caliper assembly, wherein the brake pad portion of the caliper assembly moves in response to fluid being provided through the brake line; and
    positioning a brake shield adjacent a portion of the caliper assembly, wherein at least a portion of the brake line is arranged within a first recessed portion of the brake shield and at least a portion of the brake disc is arranged within a second recessed portion of the brake shield.

11. The method of claim 10, further comprising positioning the brake line within a recess of a brake line shield.

12. The method of claim 11, wherein the brake line shield is u-shaped.

13. The method of claim 10, the brake shield further comprising at least one projection extending radially outward from an outer surface of the brake shield.

14. The method of claim 13, wherein the at least one projection is generally parallel to an axis of rotation of the wheel.

15. The method of claim 13, wherein the at least one projection is angled relative to an axis of rotation of the wheel.

16. The method of claim 13, wherein each of the at least one projections is parallel to each other at an outer portion of the brake shield.

17. The method of claim 10, wherein the brake shield is removably coupled to the caliper assembly.

18. A brake assembly for a wheel, comprising:
a brake disc;
a caliper assembly operably coupled to the brake disc and including a caliper carrier portion and a brake pad portion;
a brake line fluidly coupled to the caliper assembly and configured to move the brake pad portion of the caliper assembly relative to the brake disc;
a brake line shield having a recess for receiving the brake line, the recess defined within an upper portion, a first side wall member and a second side wall member, and the first and second side wall members extending downwardly from the upper portion; and
a brake shield positioned adjacent a portion of the caliper assembly, wherein the brake shield comprises a concave surface extending from the brake disc that is configured to conceal the brake line.

19. The brake assembly of claim 18, the brake shield further comprising at least one projection extending radially outward from an outer surface of the brake shield.

20. The brake assembly of claim 19, wherein the at least one projection is generally parallel to an axis of rotation of the wheel.

21. The brake assembly of claim 19, wherein the at least one projection is angled relative to an axis of rotation of the wheel.

22. The brake assembly of claim 19, wherein each of the at least one projections is parallel to each other at an outer portion of the brake shield.

23. The brake assembly of claim 18, wherein the brake line shield is u-shaped and the upper portion extends generally parallel with a concealed portion of the brake line.

24. The brake assembly of claim 18, wherein the brake shield is removably coupled to the caliper assembly.

25. The brake assembly of claim 18, wherein the brake shield is integral with the caliper carrier of the caliper assembly.

* * * * *